(12) United States Patent
Pan (10) Patent No.: US 7,149,306 B2
(45) Date of Patent: Dec. 12, 2006

(54) HOUSING ASSEMBLY OF PORTABLE ELECTRONIC DEVICE

(75) Inventor: Long-Jyh Pan, Taipei (TW)

(73) Assignee: BenQ Corporation (TW)

( * ) Notice: Subject to any disclaimer, the term of this patent is extended or adjusted under 35 U.S.C. 154(b) by 248 days.

(21) Appl. No.: 10/654,468

(22) Filed: Sep. 4, 2003

(65) Prior Publication Data

US 2004/0045961 A1   Mar. 11, 2004

(30) Foreign Application Priority Data

Sep. 11, 2002   (TW) ............................. 91214300 U (51) Int. Cl.
*H04M 9/00* (2006.01)
*H04M 1/00* (2006.01)

(52) U.S. Cl. ............................. 379/433.01; 455/575.1

(58) Field of Classification Search ........... 379/433.01, 379/428.01, 433.12; 455/550.1, 575.1, 90.3
See application file for complete search history.

(56) References Cited

U.S. PATENT DOCUMENTS 5,946,395 A *   8/1999   Petrella et al. ......... 379/433.01
6,341,227 B1 *  1/2002   Moster et al. ........... 455/550.1
6,980,840 B1 * 12/2005   Kim et al. ............... 455/575.4
2004/0204001 A1 * 10/2004   Chen et al.

* cited by examiner

*Primary Examiner*—William J. Deane, Jr.
(74) *Attorney, Agent, or Firm*—Pillsbury Winthrop Shaw Pittman LLP (57) ABSTRACT

The present invention discloses a housing assembly of a portable electronic device. The housing assembly includes the first housing having a clasp and the second housing having a clasp and a clip. The first and second plates have latches and are slidably disposed on the first housing respectively. When the first and second housing are assembled together, the clasps on the first and second housings are joined together. Subsequently, the first and second plates slide and the clips are coupled to the latches. The first and second plates may be replaced by a U-shape plate. The U-shape plate is slidably disposed on the first housing and has a latch. When the first and second housing are assembled together, the clasps on the first and second housings are joined together. Subsequently, the U-shape plate slides and the clip is coupled to the latch.

15 Claims, 10 Drawing Sheets

HOUSING ASSEMBLY OF PORTABLE ELECTRONIC DEVICE

CROSS REFERENCE TO RELATED APPLICATIONS

This application claims priority of Taiwan Patent Application Serial No. 091214300 entitled "Housing Assembly of Portable Electronic Device", filed Sep. 11, 2002.

FIELD OF THE INVENTION

The present invention relates to a housing assembly of a portable electronic device, and especially to a changeable housing assembly of a mobile phone.

BACKGROUND OF THE INVENTION

The portable electronic devices become more and more popular as the modern technology develops. For example, portable electronic devices with wireless communication module, such as mobile phone, are widely used in work, everyday life, and even entertainment. Moreover, the consumers consider to purchase mobile phones not only because the capabilities of communication but also other additional aspects, such as the capability of selectively changing the housing in their favor.

Conventional housing-changeable mobile phone has a front housing and a rear housing. One of the housing has a clasp and the other housing has a corresponding indentation. The clasp and the indentation are configured to make the housings manual detachable and changeable. However, such design can not provide both convenience and stability during assembling at the same time. For example, a shorter clasp is used in order to be easily detached. However, the housing tends to detach accidentally in some circumstances due to the shorter clasp.

Contrarily, a longer clasp is used to prevent the accidentally detachment of the housing. However, the clasp will be difficult detached from the indentation when a user wants to change the housing. Therefore, a housing assembly with features of both convenience and stability is an essential factor in research and development.

SUMMARY OF THE INVENTION

The aspect of the present invention is to provide a changeable housing assembly of a portable electronic device, e.g. a changeable housing assembly of a mobile phone.

According to one embodiment of the present invention, a housing assembly of a portable electronic device is disclosed. The housing assembly includes a first housing, a second housing, and a first side plate. The first housing has a first clasp and a first side wall. The second housing has a second clasp and a first clip. The first side wall has a first slot. The first side plate has a first rib and a first latch, wherein the first rib is inserted into the first slot to allow the first side plate selectively locating at a first position and a second position relative to the first housing. The first clasp is engaged with the second clasp to position the second housing. When the first side plate is at the first position, the first latch is engaged with the first clip to lock the second housing to form the housing assembly. When the first side plate is at the second position, the first latch is detached from the first clip to release the second housing.

The above-mentioned housing assembly further includes a second side plate. The second plate has a second rib and a second latch. The first housing further includes a second side wall and a second slot. The second housing further includes a second clip. The second rib is inserted into the second slot to allow the second side plate selectively locating at a first position and a second position relative to the first housing. When the second side plate is at the first position, the second latch is engaged with the second clip to lock the second housing to form the housing assembly. When the second side plate is at the second position, the second latch is detached from the second clip to release the second housing.

According to another embodiment of the present invention, a housing assembly of a portable electronic device is disclosed. The housing assembly includes a first housing, a second housing, and a U-shaped plate. The first housing includes at least one first clasp, a first side wall and a second side wall. The first side wall has a first slot and the second side wall has a second slot. The U-shaped plate has a first rib, a second rib, and a first latch. The first rib is inserted into the first slot and the second rib is insert into the second slot to allow the U-shaped plate slidably engage with the first housing. The U-shaped plate is selectively located at a first position and a second position. The second housing has at least one second clasp and a clip. The first clasp is engaged with the second clasp to position the second housing. When the U-shaped plate is at the first position, the first latch is engaged with the first clip to lock the second housing to form the housing assembly. When the U-shaped plate is at the second position, the first latch is detached from the first clip to release the second housing.

DETAILED DESCRIPTION OF THE INVENTION

The present invention provides a housing assembly of a portable electronic device. The housing assembly can be easily installed and detached by users. Such housing assembly is suitable for a changeable housing of a mobile phone. Users can choose their favor from various housing assemblies.

Figure 1:
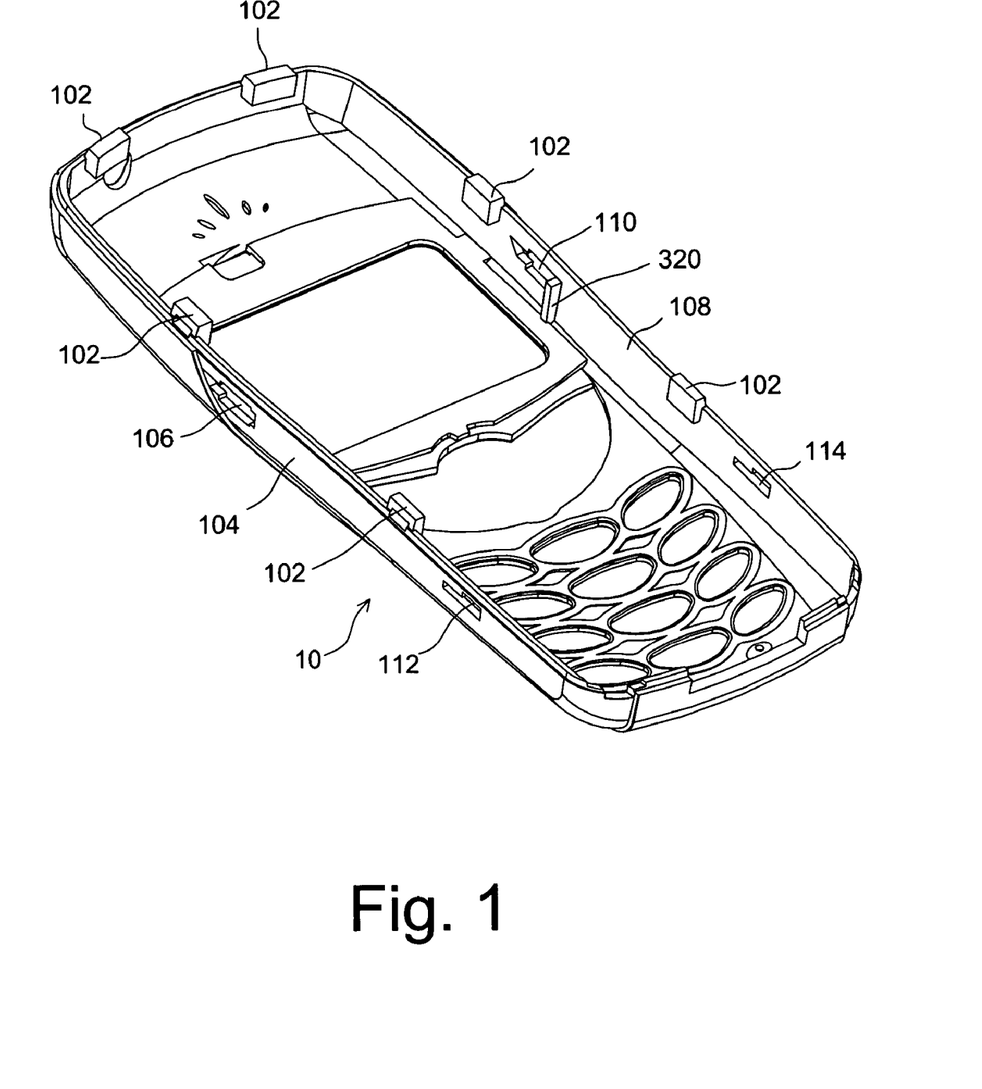
FIG. 1 shows the first housing in accordance with one embodiment of the present invention.
Figure 2:
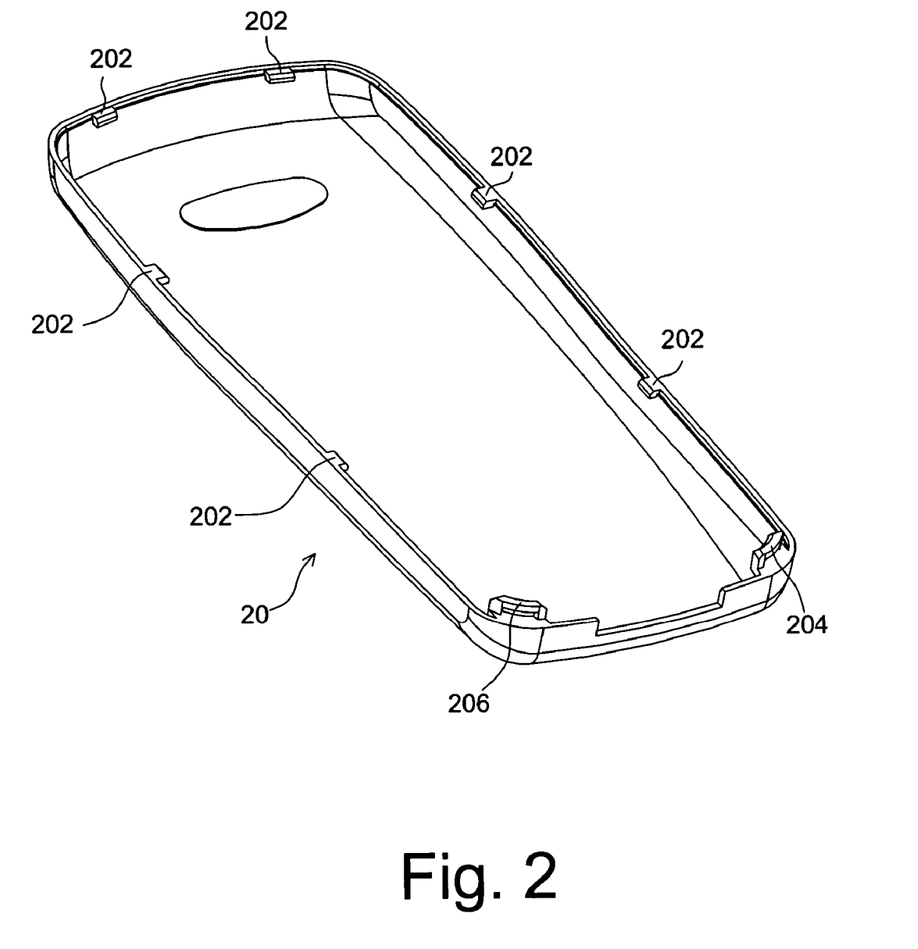
FIG. 2 shows the second housing in accordance with the embodiment of the present invention.

The housing assembly essentially includes a first housing and a second housing. A side plate affixes the second housing to the first housing. In one embodiment, the present invention is embodied as a mobile phone. FIG. 1 and FIG. 2 respectively depict a first housing 10 and a second housing 20. The housing assembly covers the phone module (not illustrated). The phone module includes well-known elements such as an antenna, a keypad, a liquid crystal display, a printed circuit board, and so on. As shown in FIG. 1, the first housing 10 may include a plurality of opening for accessing the phone module by users, e.g. reading information from the liquid crystal display, and operating the keypad.

When a user wants to change the housing assembly of the mobile phone, the essential aspects are the first housing 10 and the second housing 20 of the present invention. The other units, such as the phone module, are not elaborated here for conciseness. Referring to the FIG. 1 and FIG. 2, the first housing 10 and the second housing 20 respectively have at least one first clasp 102 and at least one second clasp 202. The numbers and locations of the first clasp 102 and the second clasp 202 depend on the shape of the housing assembly. The second housing 20 further includes a first clip 204 and a second clip 206.

Figure 3:
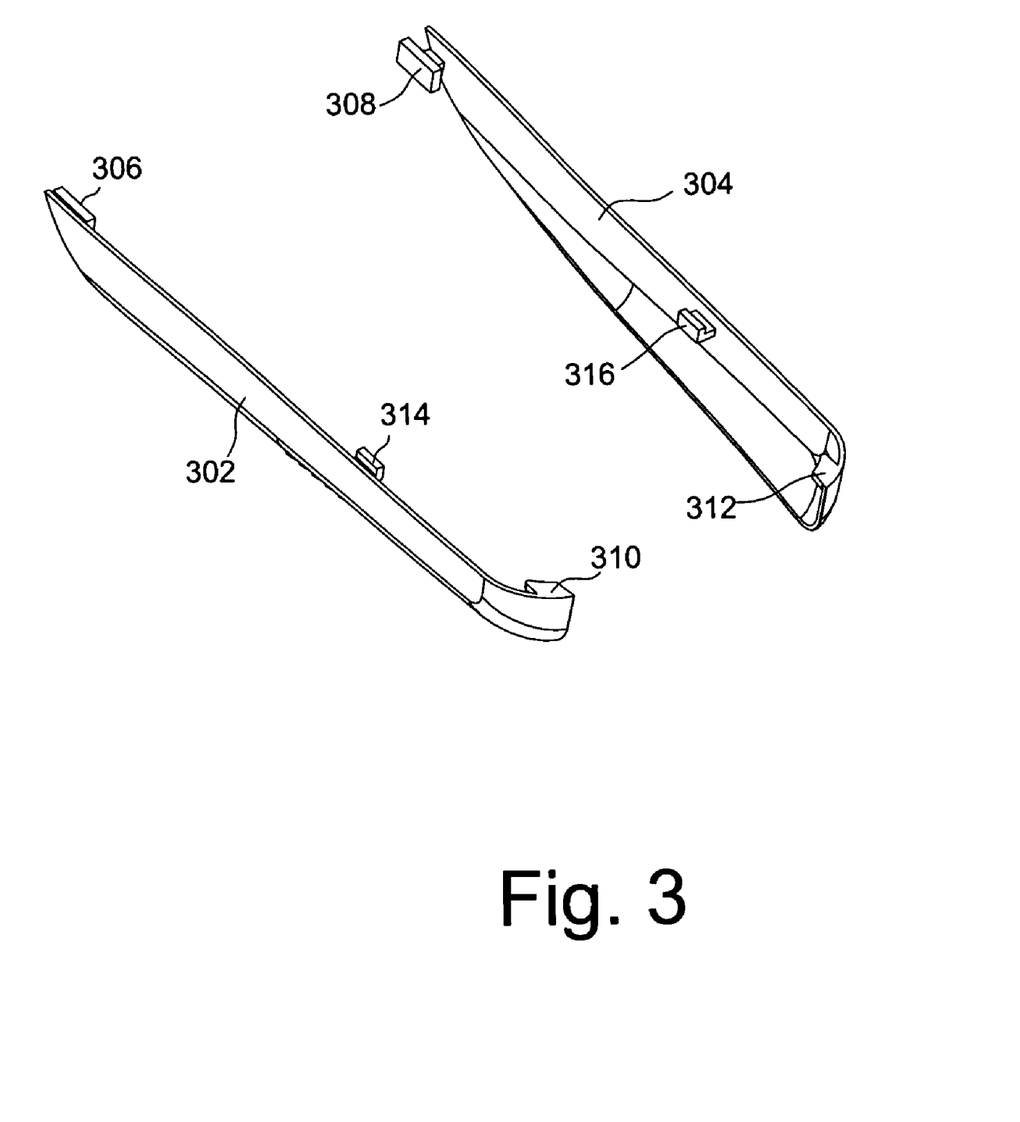
FIG. 3 shows the first side plate and the second side plate.
Figure 4:
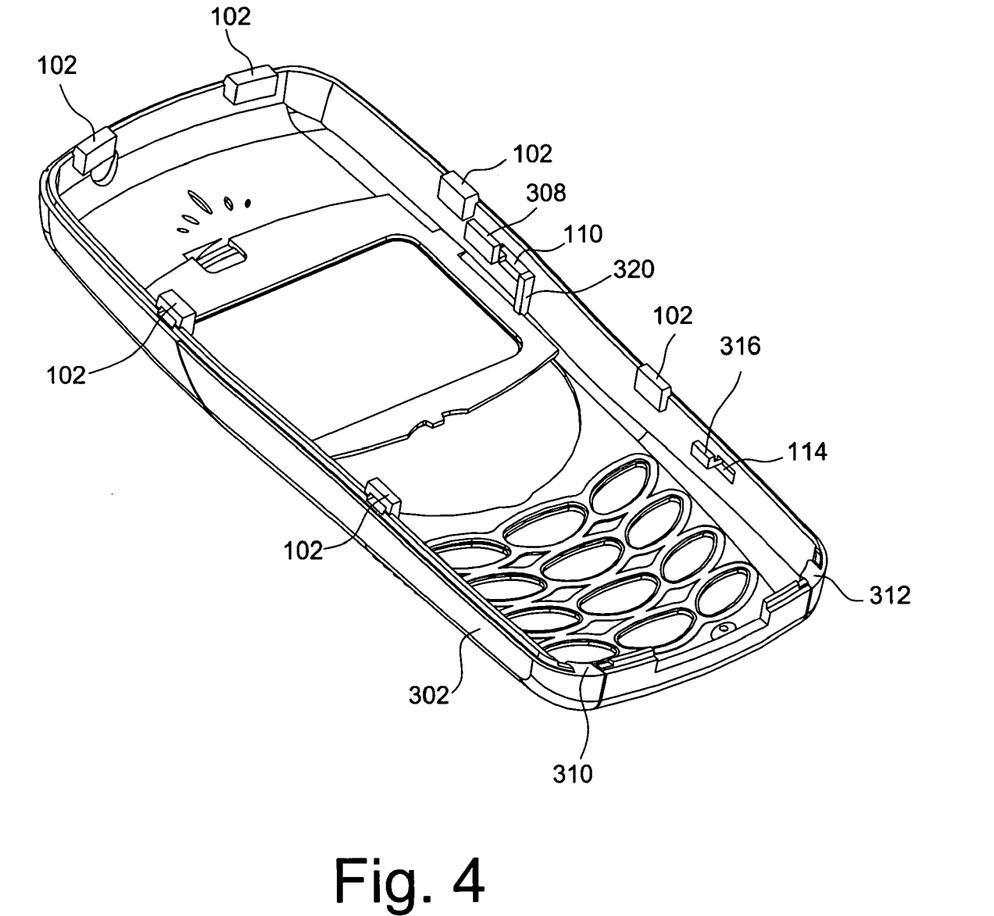
FIG. 4 shows the first side plate and the second side plate slidably engaged with the first housing.

FIG. 3 shows a first side plate 302 and a second side plate 304. The numbers of the side plate can be one or more depending on the designed shape of the housing assembly. Two side plates, the first plate 302 and the second side plate 304, are used as an exemplary embodiment here. The first housing 10 includes a first side wall 104 and a second side wall 108 (illustrated in FIG. 1). The first side wall 104 and the second side wall 108 respectively have a first slot 106 and a second slot 110. The first side plate 302 and the second side plate 304 respectively have a first rib 306, a second rib 308, a first latch 310, and a second latch 312. Referring to FIG. 4, the first rib 306 and the second rib 308 are respectively inserted into the first slot 106 and the second slot 110 to allow the first side plate 302 and the second side plate 304 slidably engaged with the first housing 10. In order to further strengthen the structure of the housing assembly, the first side plate 302 and the second side plate 304 can respectively have a third clasp 314 and a fourth clasp 316 (illustrated in FIG. 3). The first side wall 104 and the second side wall 108 of the first housing 10 can respectively have a third slot 112 and a fourth slot 114 (illustrated in FIG. 1). The third clasp 314 and the fourth clasp 316 are respectively engaged with the third slot 112 and the fourth slot 114.

Figure 5A:
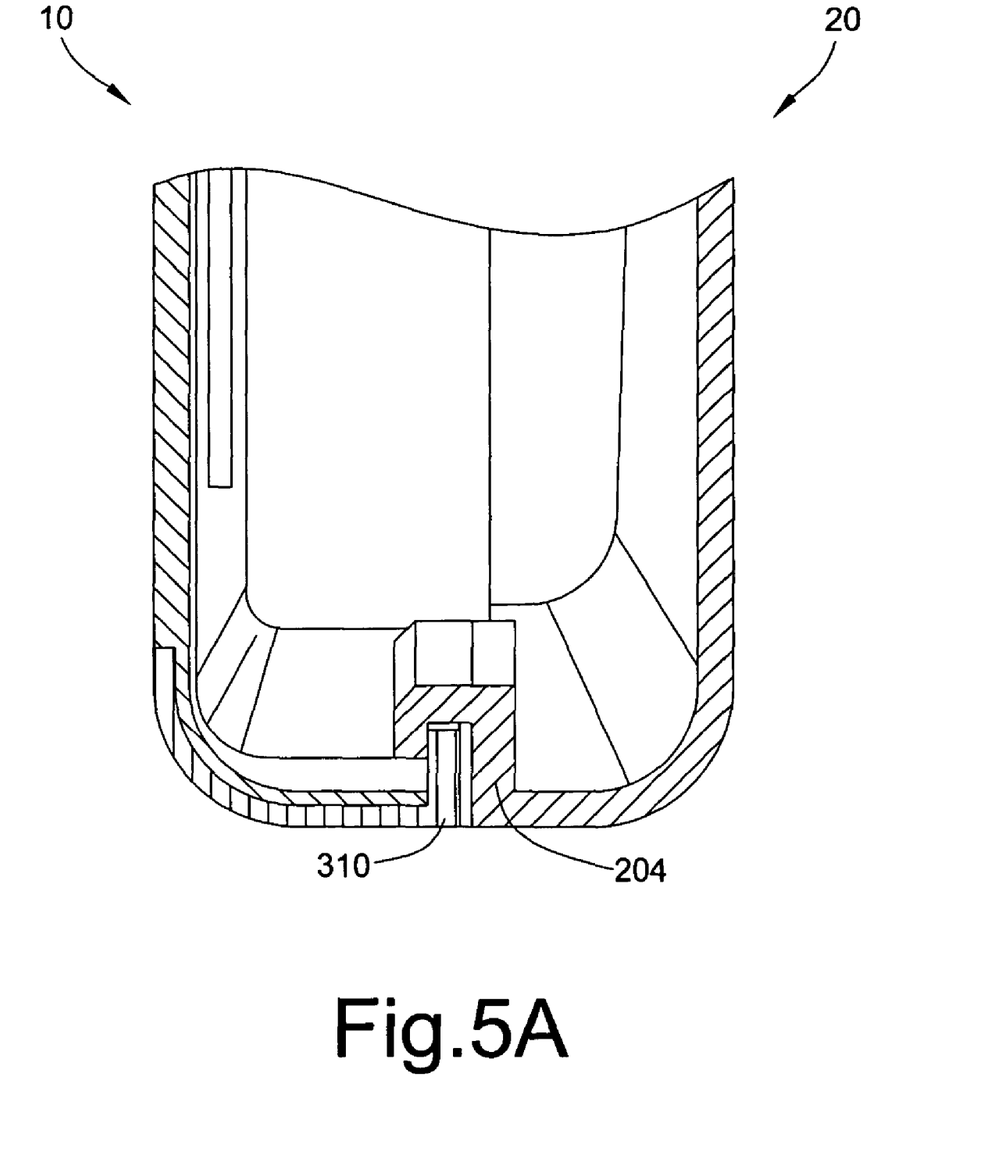
FIG. 5A shows the side plate being at first position and locking the second housing.
Figure 5B:
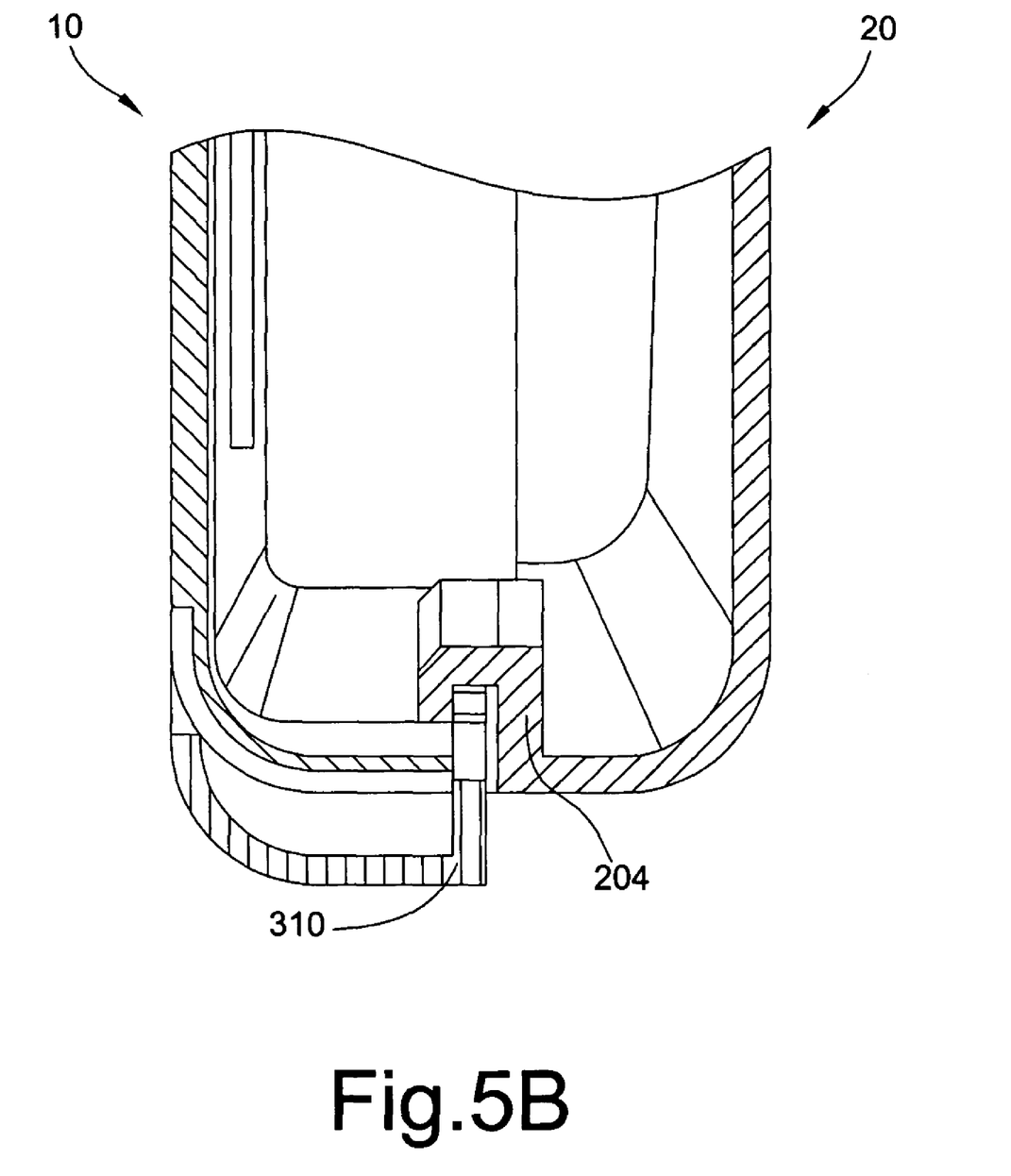
FIG. 5B shows the side plate being at second position and releasing the second housing.

The first side plate 302 and the second side plate 304 selectively locate at a first position and a second position relative to the first housing 10. FIG. 5A shows the first side plate 302 locating at the first position and locking the second housing 20. When the first plate 302 locates at the first position, the first latch 310 is engaged with the first first clip 204 to lock the second housing 20. FIG. 5B shows the first side plate 302 locating at the second position and releasing the second housing 20. When the first plate 302 slides to the second position, the first latch 310 is detached from the first clip 204 to release the second housing 20. The second plate 304 operates at the similar way, selectively locking or releasing the second housing 20 by interaction between the second latch 312 and the second clip 206 (not illustrated).

Figure 6:
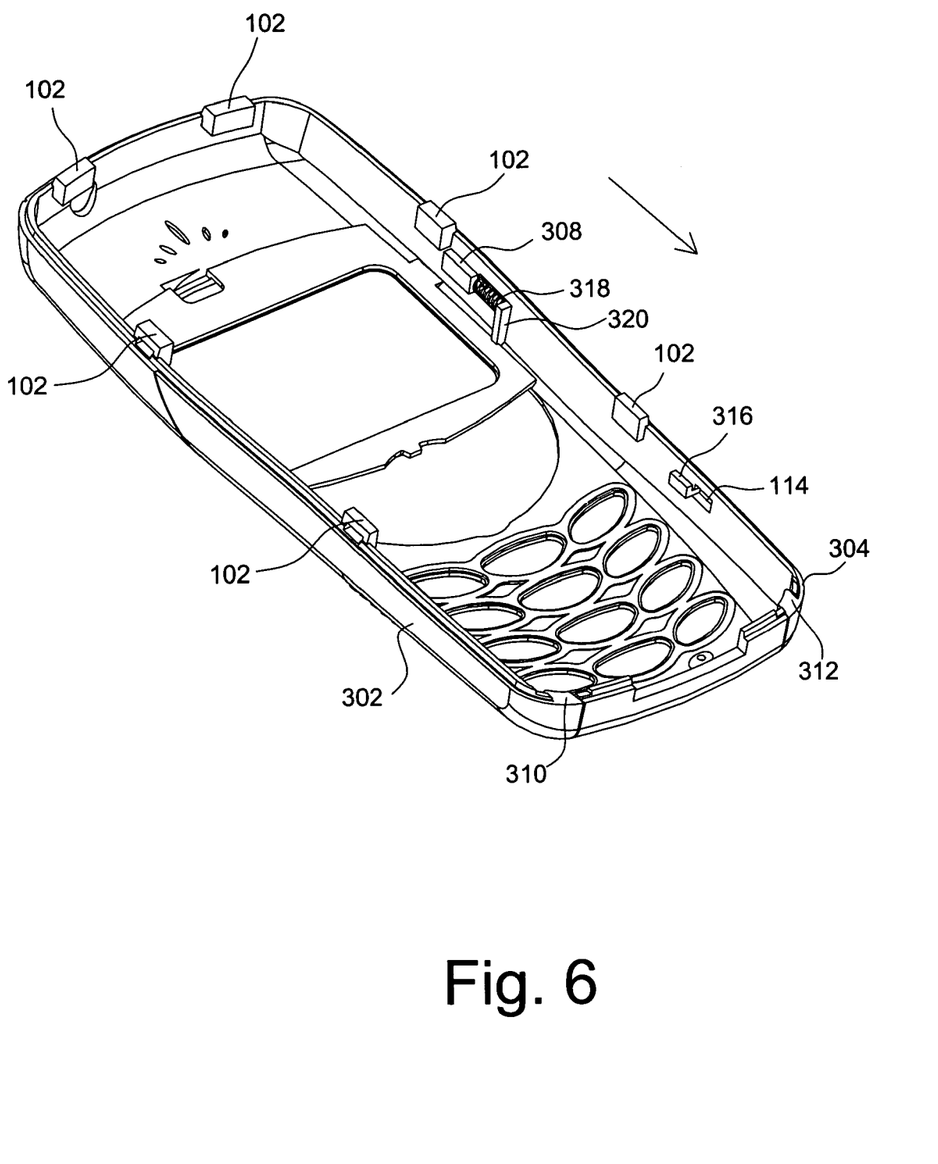
FIG. 6 shows the elastic element disposed between the block and the rib with the first and the second side plate.

Referring to FIG. 6, the first side wall 104 (illustrated in FIG. 1) of the housing assembly further includes a first elastic element (not illustrated), e.g. a spring and other elastic object with similar function, and a first block (not illustrated) near the first slot 106 (illustrated in FIG. 1). Similarly, the second side wall 108 (illustrated in FIG. 1) of the housing assembly further includes a second elastic element 318 and a second block 320. The second block 320 is disposed near the second slot 110. The second elastic element 318 is disposed between the second rib 308 and the second block 320 to provide a restore force to the second rib 308 to push the second side plate 304 back to the first position. The first elastic element and the first block operate in similar way and is not elaborated here for conciseness.

The assembling process between the first housing 10 and the second housing 20 is as following description. The first clasp 102 is engages with the second clasp 202 to position the second housing 20. The first side plate 302 slides to the first position to engage the first latch 310 with the first clip 204. The second side plate 304 slides to the first position to engage the second latch 312 with the second clip 206. So, the first side plate 302 and the second side plate 304 lock the second housing 20 to form the housing assembly.

The detaching process between the first housing 10 and the second housing 20 is as following description. The first side plate 302 slides to the second position to detach the first latch 310 from the first clip 204. The second side plate 304 slides to the second position to detach the second latch 312 from the second clip 206. The first clasp 102 is disengaged from the second clasp 202 to detach the second housing 20 from the first housing 10.

Figure 7:
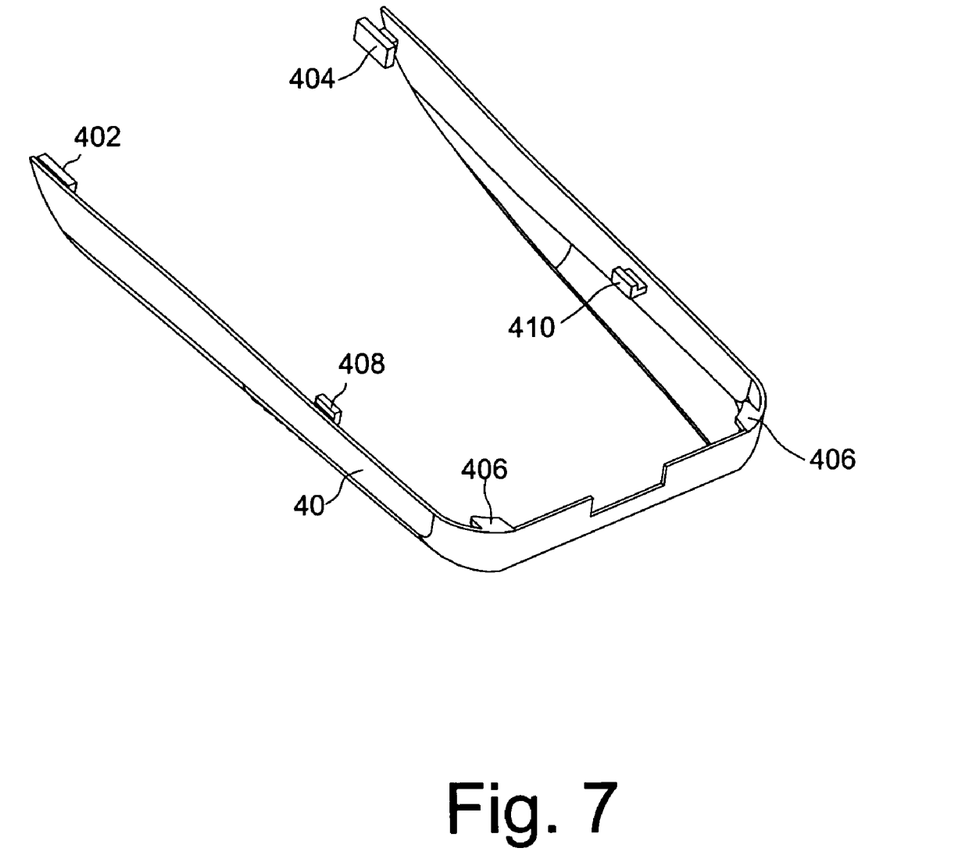
FIG. 7 shows the U-shaped plate in accordance with another embodiment of the present invention.
Figure 8:
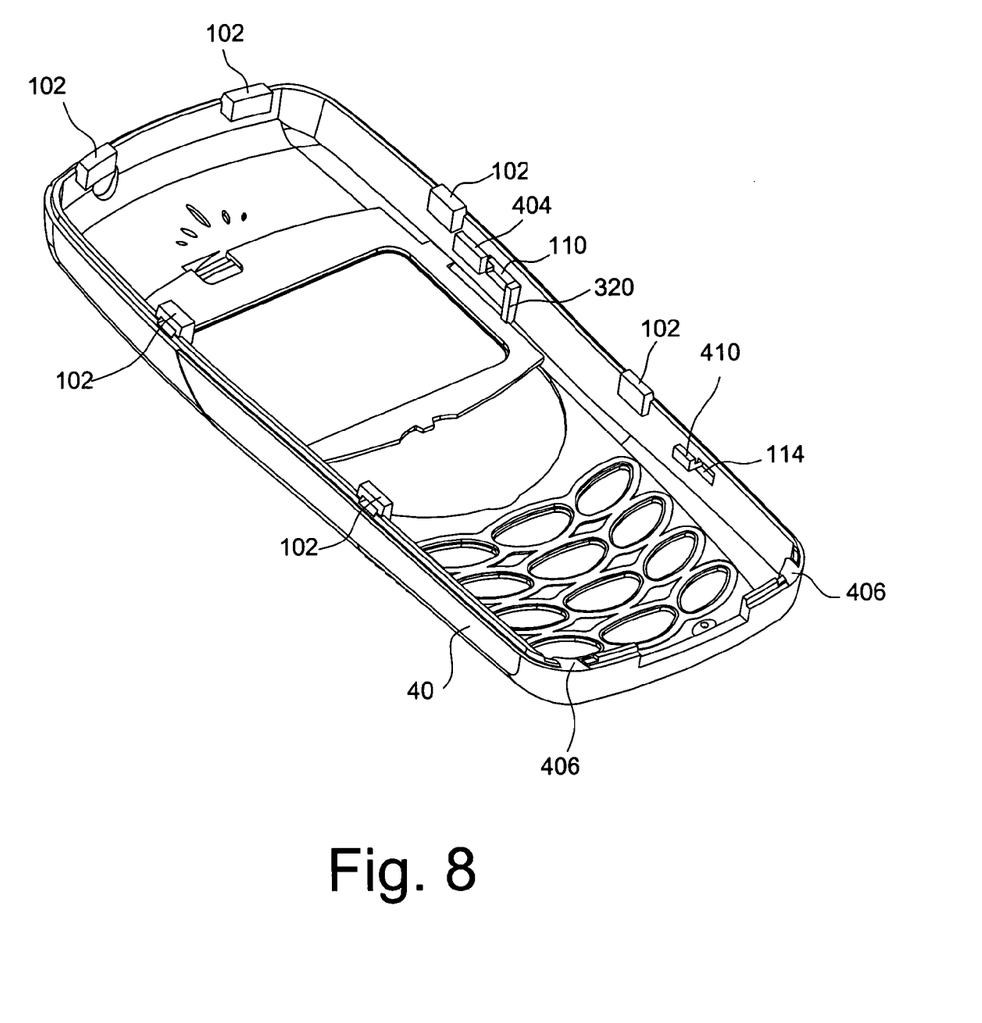
FIG. 8 shows the U-shaped plate slidably engaged with the first housing.

In accordance with another embodiment of the present invention, the first side plate 302 and the second side plate 304 can be replaced by a U-shaped plate. Referring to FIG. 7, a U-shaped plate 40 has two arms substantially paralleled with each other. The U-shaped plate 40 includes a first rib 402, a second rib 404 and at least one latch 406. The numbers and locations of the latch can be one or more depending on the designed shape of the housing assembly, and two latches 406 are used as an exemplary embodiment here. When the first rib 402 and the second rib 404 are respectively inserted into the first slot 106 and the second slot 110 (illustrated in FIG. 1), the U-shaped plate is slidably engaged with the first housing and selectively located at a first position and a second position. As shown in FIG. 8, the first side wall 104 and the second side wall 108 of the first housing 10 further respectively include a third slot 112 and a fourth slot 114. The U-shaped plate 40 further includes a third clasp 408 and a fourth clasp 410 respectively inserted into the third slot 112 and fourth slot 114 to further strengthen the structure of the housing assembly.

Figure 9:
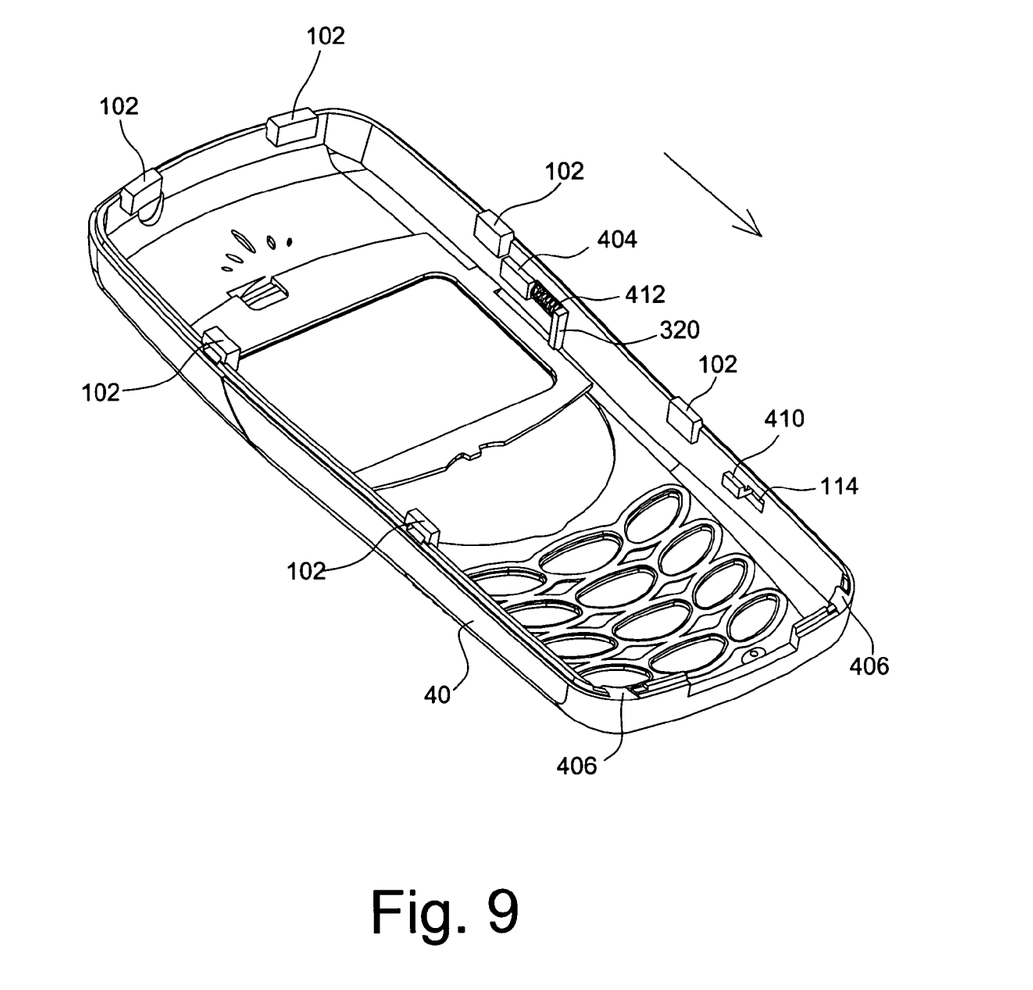
FIG. 9 shows the elastic element disposed between the block and the rib with the U-shaped plate.

Referring to FIG. 9, the first side wall 104 (illustrated in FIG. 1) of the housing assembly further includes a first elastic element (not illustrated), e.g. a spring and other elastic object with similar function, and a first block (not illustrated) near the first slot 106 (illustrated in FIG. 1). Similarly, the second side wall 108 (illustrated in FIG. 1) of the housing assembly further includes a second elastic element 412 and a second block 320. The second block 320 is disposed near the second slot 110 (illustrated in FIG. 1). The second elastic element 412 is disposed between the second rib 404 and the second block 320 to provide a restore force to the second rib 404 to push the U-shaped plate 40 back to the first position. The first elastic element and the first block operate in similar way and is not elaborated here for conciseness.

The assembling process between the first housing 10 and the second housing 20 is as following description. The first clasp 102 is engages with the second clasp 202 to position the second housing 20. The U-shaped plate 40 slides to the first position to engage the latches 406 with the first clip 204 and the second clip 206. So, the U-shaped plate 40 locks the second housing 20 to form the housing assembly.

The detaching process between the first housing 10 and the second housing 20 is as following description. The U-shaped plate 40 slides to the second position to detach the latches 406 from the first clip 204 and the second clip 206. The first clasp 102 is disengaged from the second clasp 202 to detach the second housing 20 from the first housing 10.

It should be noted that the above description sets forth various preferred embodiments of the invention only, and is not intended to limit the scope, applicability, or configuration of the invention in any way. Rather, various changes may be made in the function and arrangement of the elements described in these embodiments without departing from the spirit and scope of the invention. Thus, the protected scope of the present invention is as set forth in the appended claims.

What is claim is:

1. A housing assembly of portable electronic device, comprising:
   a first housing having a side wall and at least one first slot on the side wall;
   a side plate being slidably disposed on the side wall of the first housing, the side plate including at least one first rib at one end of the side plate, the side plate selectively locating at a first position and a second position relative to the first housing; and
   a second housing being detachably engaged with the first housing to form an inner space;
   wherein when the side plate is at the first position, the first rib is inserted into the inner space through the first slot to allow the side plate slidably engage with and lock the first housing to form the housing assembly, and when the side plate is at the second position, the side plate releases the second housing.

2. The housing assembly of claim 1, wherein:
   the first housing includes at least one first clasp;
   the second housing includes at least one second clasp; and
   the first clasp is engaged with the second clasp to position the second housing when the first housing is engaged with the second housing.

3. The housing assembly of claim 1, wherein:
   the side plate includes at least one first latch;
   the second housing includes at least one first clip; and
   the first latch is engaged with the first clip to lock the second housing when the slide plate is at the first position, and the side plate slides to disengage the first latch from the first clip to release the second housing when the side plate is at the second position.

4. The housing assembly of claim 1, wherein:
   the first housing includes at least one first block disposed on an inner surface of the first housing and near the first slot;
   the first housing includes at least one first elastic unit disposed between the first block and the first slot; and
   the elastic unit provides a restore force to the first rib to push the side plate back to the first position.

5. A housing assembly of portable electronic device, comprising:
   a first housing, having a first side wall, a second side wall, and at least one first clasp, the first side wall having a first slot and the second side wall having a second slot;
   a first plate, having a first rib and a first latch, the first rib of the first plate being inserted into the first housing through the first slot to allow the first plate slidably engage with the first housing;
   a second plate, having a second rib and a second latch, the second rib of the second plate being inserted into the first housing through the second slot to allow the second plate slidably engage with the first housing;
   a second housing, having a first clip, a second clip, and at least one second clasp; and
   a first block disposed on an inner surface of the first housing and near the first slot;
   a first elastic unit disposed inside the first housing and between the first block and the first rib to provide a force to push the first rib and lock the first housing;
   wherein the first clasp is engaged with the second clasp, the first clip is engaged with the first latch, and the second clip is engaged with the second latch, for assembling the first housing with the second housing to form the housing assembly.

6. The housing assembly of claim 5, the first side wall of the first housing further comprising a third slot and the first plate further comprising a third clasp, wherein the third clasp is inserted into the third slot to allow the first plate slidably engage with the first housing.

7. The housing assembly of claim 6, the second side wall of the first housing further comprising a fourth slot and the second plate further comprising a fourth clasp, wherein the fourth clasp is inserted into the fourth slot to allow the second plate slidably engage with the first housing.

8. The housing assembly of claim 5, further comprising a second elastic unit and a second block on an inner surface of the first housing and near the second slot of the first housing, wherein the second elastic unit disposed inside the first housing and between the second block and the second rib to provide a force to push the second rib and lock the first housing.

9. The housing assembly of claim 8, wherein the first elastic unit and the second elastic unit are springs.

10. A housing assembly of portable electronic device, comprising:
    a first housing, having a first side wall, a second side wall, and at least one first clasp, the first side wall having a first slot and the second side wall having a second slot;
    a U-shaped plate, having a first rib, a second rib and a latch, the first rib being inserted into the first housing through the first slot and the second rib being inserted into the first housing through the second slot to allow the U-shaped plate slidably engage with the first housing;
    a second housing, having a clip, and at least one second clasp; and
    a first block disposed on an inner surface of the first housing and near the first slot;
    a first elastic unit disposed inside the first housing and between the first block and the first rib to provide a force to push the first rib and lock the first housing;
    wherein the first clasp is engaged with the second clasp, and the clip of the U-shaped plate is engaged with the latch, for assembling the first housing with the second housing to form the housing assembly.

11. The housing assembly of claim 10, the first side wall of the first housing further comprising a third slot and the U-shaped plate further comprising a third clasp, wherein the third clasp is inserted into the third slot to allow the U-shaped plate slidably engage with the first housing.

12. The housing assembly of claim 11, the second side wall of the first housing further comprising a fourth slot and the U-shaped plate further comprising a fourth clasp, wherein the fourth clasp is inserted into the fourth slot to allow the U-shaped plate slidably engage with the first housing.

13. The housing assembly of claim 10, further comprising a second elastic unit and a second block on the inner surface of the first housing and near the second slot of the first housing, wherein the second elastic unit disposed inside the first housing and between the second block and the second rib to provide a force to push the second rib and lock the first housing.

14. The housing assembly of claim 13, wherein the first elastic unit and the second elastic unit are springs.

15. The housing assembly of claim 10, the U-shaped plate having two arms, wherein the two arms of the U-shaped plate are parallel with each other substantially.

* * * * *